US009906529B2

(12) United States Patent
Shinoda

(10) Patent No.: US 9,906,529 B2
(45) Date of Patent: Feb. 27, 2018

(54) RELAY APPARATUS, RELAY SYSTEM, RELAY METHOD, AND NON-TRANSITORY COMPUTER READABLE MEDIUM

(71) Applicant: FUJI XEROX CO., LTD., Minato-ku, Tokyo (JP)

(72) Inventor: Kazumoto Shinoda, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 201 days.

(21) Appl. No.: 14/327,089

(22) Filed: Jul. 9, 2014

(65) Prior Publication Data

US 2015/0101023 A1    Apr. 9, 2015

(30) Foreign Application Priority Data

Oct. 9, 2013 (JP) ................................ 2013-211885

(51) Int. Cl.
H04L 29/06 (2006.01)
H04L 9/32 (2006.01)
(Continued)

(52) U.S. Cl.
CPC .............. *H04L 63/10* (2013.01); *G06F 21/30* (2013.01); *G06F 21/31* (2013.01); *G06F 21/335* (2013.01);
(Continued)

(58) Field of Classification Search
CPC ........ G06F 21/30; G06F 21/31; G06F 21/335; G06F 21/41; G06F 21/604; G06F 21/608;
(Continued)

(56) References Cited

U.S. PATENT DOCUMENTS 8,572,707 B2 * 10/2013 Tuchman .............. H04L 9/3226
713/168
8,839,383 B2 *  9/2014 Van Horn ................. H04L 9/32
726/18
(Continued)

FOREIGN PATENT DOCUMENTS

JP    2006-085670 A    3/2006
JP    2007-152705 A    6/2007
(Continued)

OTHER PUBLICATIONS

Communication dated Jul. 4, 2017, issued from the Japan Patent Office in corresponding Application No. 2013-211885.
(Continued)

*Primary Examiner* — Theodore C Parsons
*Assistant Examiner* — Christopher Ruprecht
(74) *Attorney, Agent, or Firm* — Sughrue Mion, PLLC

(57) ABSTRACT

A relay apparatus includes a memory that stores right information indicating a right to access a service providing apparatus, a first retrieval unit that retrieves, from a client apparatus, identification information of a user registered in the service providing apparatus that is a target of an access request from the client apparatus, and an access unit that accesses the service providing apparatus as the target using the identification information retrieved by the first retrieval unit instead of the right information stored on the memory if the right information to access the service providing apparatus as the target is not valid.

22 Claims, 11 Drawing Sheets

(51) Int. Cl.
| | |
|---|---|
| *G06F 21/60* | (2013.01) |
| *G06F 21/33* | (2013.01) |
| *G06F 21/30* | (2013.01) |
| *G06F 21/31* | (2013.01) |
| *G06F 21/62* | (2013.01) |

(52) U.S. Cl.
CPC .......... *G06F 21/608* (2013.01); *G06F 21/62* (2013.01); *G06F 21/629* (2013.01); *H04L 9/32* (2013.01); *H04L 9/321* (2013.01); *H04L 9/3213* (2013.01); *H04L 9/3226* (2013.01); *H04L 9/3228* (2013.01); *H04L 63/08* (2013.01); *H04L 63/083* (2013.01); *H04L 63/0807* (2013.01); *H04L 63/101* (2013.01); *G06F 2221/2137* (2013.01)

(58) Field of Classification Search
CPC .............. G06F 21/62; G06F 21/629; G06F 2221/2137; H04L 63/0281; H04L 63/08; H04L 63/0807; H04L 63/083; H04L 63/10; H04L 63/101; H04L 63/108; H04L 9/32; H04L 9/321; H04L 9/3213; H04L 9/3226; H04L 9/3228
See application file for complete search history.

(56) References Cited

U.S. PATENT DOCUMENTS

| | | | |
|---|---|---|---|
| 9,021,570 B2* | 4/2015 | Uchida | G06F 21/41 726/8 |
| 2005/0138362 A1* | 6/2005 | Kelly | H04L 63/0807 713/156 |
| 2005/0154887 A1* | 7/2005 | Birk | G06F 21/41 713/168 |
| 2005/0160276 A1* | 7/2005 | Braun | H04L 63/10 713/185 |
| 2006/0061803 A1 | 3/2006 | Oka | |
| 2006/0106721 A1* | 5/2006 | Hori | H04L 9/0838 705/51 |
| 2007/0127051 A1 | 6/2007 | Sakayama et al. | |
| 2009/0094684 A1* | 4/2009 | Chinnusamy | H04L 63/0281 726/4 |
| 2009/0113543 A1* | 4/2009 | Adams | G06F 21/33 726/18 |
| 2009/0222900 A1* | 9/2009 | Benaloh | H04L 9/3213 726/9 |
| 2009/0276840 A1* | 11/2009 | Cao | H04L 9/3213 726/9 |
| 2009/0293112 A1* | 11/2009 | Moore | G06Q 20/042 726/9 |
| 2009/0328174 A1* | 12/2009 | Cen | H04L 63/08 726/7 |
| 2010/0271650 A1* | 10/2010 | Tomizawa | G06F 3/1204 358/1.13 |
| 2011/0016521 A1* | 1/2011 | Kigo | G06F 21/46 726/19 |
| 2011/0191474 A1* | 8/2011 | Fiatal | H04L 63/10 709/225 |
| 2012/0086978 A1* | 4/2012 | Uchikawa | G06F 3/1212 358/1.15 |
| 2012/0113464 A1* | 5/2012 | Inoue | H04N 1/00151 358/1.15 |
| 2012/0113471 A1 | 5/2012 | Shimada et al. | |
| 2012/0117629 A1* | 5/2012 | Miyazawa | H04L 63/08 726/4 |
| 2013/0003106 A1* | 1/2013 | Nishida | G06F 3/1222 358/1.14 |
| 2013/0019300 A1* | 1/2013 | Uchida | G06F 21/41 726/8 |
| 2013/0044343 A1* | 2/2013 | Matsugashita | G06F 3/1222 358/1.14 |
| 2013/0047247 A1* | 2/2013 | Matsuda | G06F 21/335 726/9 |
| 2013/0060889 A1* | 3/2013 | Miyazawa | H04L 63/08 709/217 |
| 2013/0179961 A1* | 7/2013 | Abe | G06F 21/608 726/9 |
| 2013/0263212 A1* | 10/2013 | Faltyn | H04W 12/08 726/1 |
| 2013/0326614 A1* | 12/2013 | Truskovsky | G06F 21/44 726/19 |
| 2014/0095557 A1* | 4/2014 | Kamma | G06F 17/30194 707/827 |
| 2014/0123240 A1* | 5/2014 | Seo | H04L 63/104 726/4 |
| 2014/0126016 A1* | 5/2014 | Namihira | H04N 1/32534 358/1.15 |
| 2014/0223516 A1* | 8/2014 | Vongsouvanh | H04L 63/0492 726/4 |
| 2014/0317187 A1* | 10/2014 | Tsujimoto | G06F 17/30011 709/204 |
| 2014/0330111 A1* | 11/2014 | Lichtenstein | G06T 11/206 600/424 |
| 2014/0331060 A1* | 11/2014 | Hayton | G06F 21/31 713/186 |
| 2014/0337955 A1* | 11/2014 | Mendelovich | H04L 63/0807 726/9 |
| 2014/0365526 A1* | 12/2014 | Sato | G06F 21/6209 707/784 |
| 2014/0373121 A1* | 12/2014 | Wied | H04L 63/0823 726/7 |
| 2015/0029535 A1* | 1/2015 | Kondoh | G06F 21/608 358/1.14 |
| 2015/0040188 A1* | 2/2015 | Takeuchi | H04L 63/08 726/3 |
| 2015/0143453 A1* | 5/2015 | Erb | H04L 63/102 726/1 |
| 2015/0143472 A1* | 5/2015 | Kim | H04W 48/02 726/4 |
| 2015/0304295 A1* | 10/2015 | Chiba | G06F 21/335 726/4 |

FOREIGN PATENT DOCUMENTS

| | | |
|---|---|---|
| JP | 2010-092456 A | 4/2010 |
| JP | 2012-113701 A | 6/2012 |
| JP | 2012-118971 A | 6/2012 |
| JP | 2012-190337 A | 10/2012 |
| JP | 2013-012897 A | 1/2013 |
| JP | 2013-041550 A | 2/2013 |

OTHER PUBLICATIONS

Communication dated Dec. 4, 2017 from the State Intellectual Property Office of the P.R.C. in counterpart application No. 201410381695.2.

* cited by examiner

| ACCOUNT INFORMATION | | SERVICE PROVIDING APPARATUS 10A | | SERVICE PROVIDING APPARATUS 10B | | SERVICE PROVIDING APPARATUS 10C | |
|---|---|---|---|---|---|---|---|
| USER ID | PASSWORD | TOKEN | STATE | TOKEN | STATE | TOKEN | STATE |
| User01@aaa.example.com | password01 | — | ABSENT | — | ABSENT | — | ABSENT |
| User02@aaa.example.com | password02 | TOKEN A2 | PRESENT | TOKEN B2 | PRESENT | TOKEN C2 | PRESENT |
| ... | ... | ... | ... | ... | ... | ... | ... |

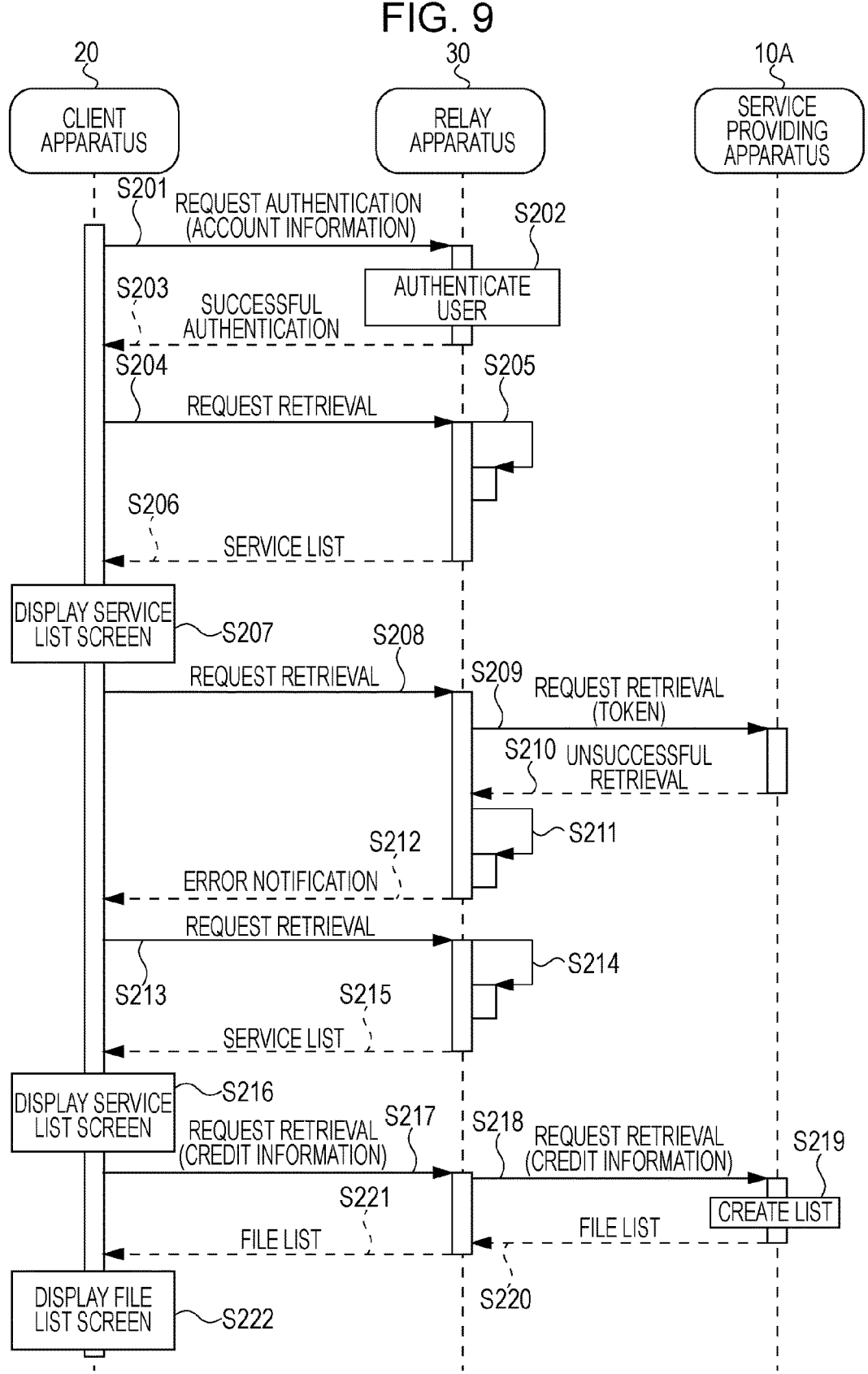

FIG. 10

| ACCOUNT INFORMATION | | SERVICE PROVIDING APPARATUS 10A | | SERVICE PROVIDING APPARATUS 10B | | SERVICE PROVIDING APPARATUS 10C | |
|---|---|---|---|---|---|---|---|
| USER ID | PASSWORD | TOKEN | STATE | TOKEN | STATE | TOKEN | STATE |
| User01@aaa.example.com | password01 | TOKEN A1 | PRESENT | TOKEN B1 | PRESENT | TOKEN C1 | PRESENT |
| User02@aaa.example.com | password02 | TOKEN A2 | PRESENT | TOKEN B2 | PRESENT | TOKEN C2 | PRESENT |
| ... | ... | ... | ... | ... | ... | ... | ... |

- ☑ SERVICE PROVIDING APPARATUS 10A    TOKEN PRESENT
- ☐ SERVICE PROVIDING APPARATUS 10B    TOKEN PRESENT
- ☐ SERVICE PROVIDING APPARATUS 10C    TOKEN PRESENT

CREDIT INFORMATION
- USER ID:
- PASSWORD:

} C1

[B1 DISPLAY LIST]   [B2 SEARCH]   [...]

FIG. 12

| ACCOUNT INFORMATION | | SERVICE PROVIDING APPARATUS 10A | | SERVICE PROVIDING APPARATUS 10B | | SERVICE PROVIDING APPARATUS 10C | | 331 |
|---|---|---|---|---|---|---|---|---|
| USER ID | PASSWORD | TOKEN | STATE | TOKEN | STATE | TOKEN | STATE | |
| User01@aaa.example.com | password01 | TOKEN A1 | EXPIRED | TOKEN B1 | PRESENT | TOKEN C1 | PRESENT | |
| User02@aaa.example.com | password02 | TOKEN A2 | PRESENT | TOKEN B2 | PRESENT | TOKEN C2 | PRESENT | |
| ... | ... | ... | ... | ... | ... | ... | ... | |

☑ SERVICE PROVIDING APPARATUS 10A    TOKEN EXPIRED

☐ SERVICE PROVIDING APPARATUS 10B    TOKEN PRESENT

☐ SERVICE PROVIDING APPARATUS 10C    TOKEN PRESENT

CREDIT INFORMATION
USER ID: user01@service_a.example.com
PASSWORD: passwordA1                                       } C1

B1: DISPLAY LIST    B2: SEARCH    ...

RELAY APPARATUS, RELAY SYSTEM, RELAY METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-211885 filed Oct. 9, 2013.

BACKGROUND (i) Technical Field

The present invention relates to a relay apparatus, a relay system, a relay method, and a non-transitory computer readable medium.

(ii) Related Art

A technique is available to access a server via a relay apparatus to use the server in a network.

SUMMARY

According to an aspect of the invention, a relay apparatus is provided. The relay apparatus includes a memory that stores right information indicating a right to access a service providing apparatus, a first retrieval unit that retrieves, from a client apparatus, identification information of a user registered in the service providing apparatus that is a target of an access request from the client apparatus, and an access unit that accesses the service providing apparatus as the target using the identification information retrieved by the first retrieval unit instead of the right information stored on the memory if the right information to access the service providing apparatus as the target is not valid.

BRIEF DESCRIPTION OF THE DRAWINGS

Exemplary embodiments of the present invention will be described in detail based on the following figures, wherein:

FIG. 9 is a sequence chart of an operation performed when a token registered on the relay apparatus has expired;

FIG. 10 illustrates an example of a user management table;

FIG. 11 illustrates an example of the service list screen;

FIG. 12 illustrates an example of an updated user management table;

FIG. 13 illustrates an example of the service list screen;

DETAILED DESCRIPTION

Figure 1:
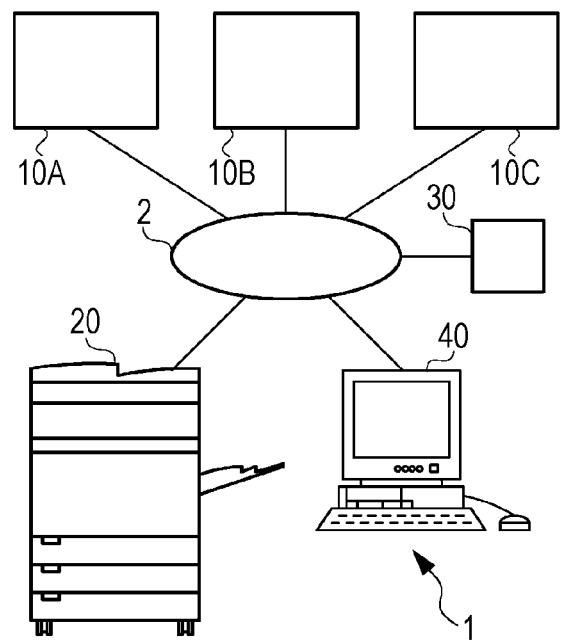
FIG. 1 generally illustrates a relay system.

FIG. 1 generally illustrates a relay system 1 of an exemplary embodiment. The relay system 1 includes service providing apparatuses 10A, 10B, and 10C, a client apparatus 20, a relay apparatus 30, and a right registration apparatus 40. In the following discussion, the service providing apparatuses 10A, 10B, and 10C are collectively referred to as a service providing apparatus 10 if they are not discriminated from each other.

The service providing apparatus 10, the client apparatus 20, the relay apparatus 30, and the right registration apparatus 40 are connected to each other via a communication line 2, such as the Internet. Note that the client apparatus 20 and the right registration apparatus 40 may be connected to the communication line 2 via another communication line, such as a local area network (LAN).

The service providing apparatus 10 provides a variety of services, including a data storage service. The services may be cloud service. A token indicating a right to access the service providing apparatus 10 or credit information provided by a right user is used to access the service providing apparatus 10.

The client apparatus 20 is an image processing apparatus and is used to use a service provided by the service providing apparatus 10. The client apparatus 20 has multiple functions including a scanning function, a copying function, a printing function, and a facsimile function.

The relay apparatus 30 has a function of relaying data between each of the client apparatus 20 and the right registration apparatus 40 and the service providing apparatus 10. With data exchanged using the relay function of the relay apparatus 30, only logging on the relay apparatus 30 enables the user to enjoy a service provided by multiple service providing apparatuses 10.

The right registration apparatus 40 is a personal computer, for example. In concert with the relay apparatus 30, the right registration apparatus 40 performs a registration operation to register a token issued by the service providing apparatus 10 onto the relay apparatus 30. There may be times when the client apparatus 20 is not configured to perform the registration operation. In place of the client apparatus 20, the right registration apparatus 40 thus performs the registration operation.

Figure 2:
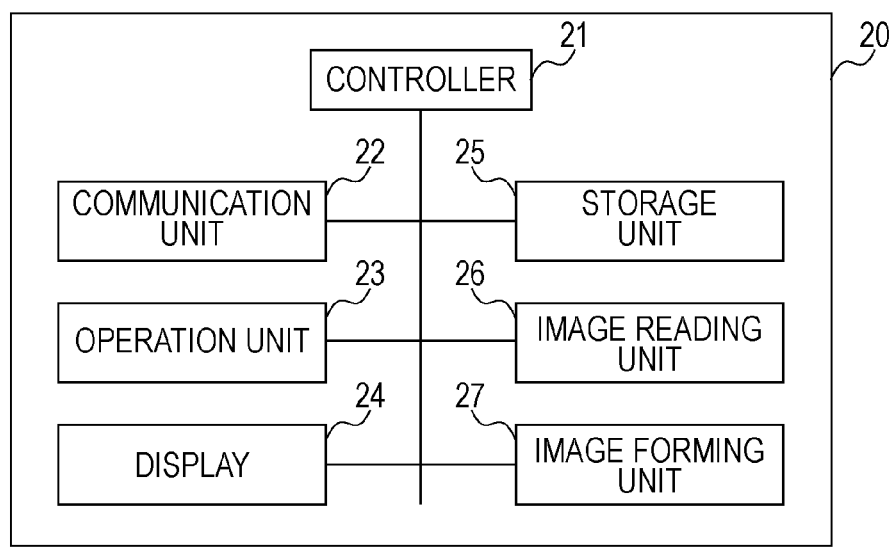
FIG. 2 illustrates a hardware configuration of a client apparatus.

FIG. 2 illustrates a hardware configuration of the client apparatus 20. The client apparatus 20 includes a controller 21, a communication unit 22, an operation unit 23, a display 24, a storage unit 25, an image reading unit 26, and an image forming unit 27.

The controller 21 includes a central processing unit (CPU), and a memory, and controls elements in the client apparatus 20. The CPU executes a program stored on the memory or the storage unit 25. The memory includes a read-only memory (ROM), and a random-access memory (RAM), for example. The ROM pre-stores a program and data. The RAM temporarily stores a program and data, and serves as a working area when the CPU executes the program.

The communication unit 22 is a communication interface to be connected to the communication line 2. The communication unit 22 communications with the relay apparatus 30 via the communication line 2. The operation unit 23 includes a variety of keys and a touchpanel, and inputs to the controller 21 information responsive to a user operation. The display 24 includes a liquid-crystal display, for example, and displays various information. The storage unit 25 includes a hard disk, for example, and stores a variety of programs and data, used by the controller 21. The programs include a Web browser.

The image reading unit 26 includes an image scanner, for example, and generates image data by reading an image of an original document. The image forming unit 27 includes a print engine of electrophotographic system, for example, and forms an image responsive to the image data on a medium such as a paper sheet.

Figures 3, 4:
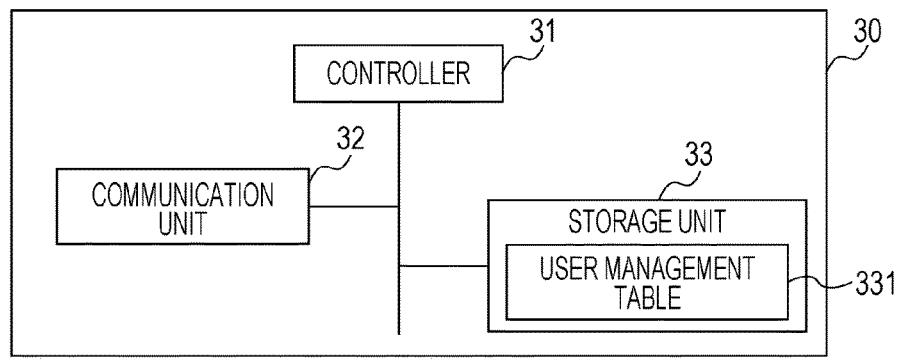
FIG. 3 illustrates a hardware configuration of a relay apparatus.
FIG. 4 illustrates an example of a user management table.

FIG. 3 illustrates a hardware configuration of the relay apparatus 30. The relay apparatus 30 includes a controller 31, a communication unit 32, and a storage unit 33.

The controller 31 includes a CPU and a memory, for example, and controls elements in the relay apparatus 30. The CPU executes a program stored on the memory or the storage unit 33. The memory includes a ROM and a RAM. The ROM pre-stores a program and data. The RAM temporarily stores a program and data, and serves as a working area when the CPU executes the program.

The communication unit 32 is a communication interface connected to the communication line 2. The communication unit 32 communicates with the client apparatus 20, the service providing apparatus 10, and the right registration apparatus 40 via the communication line 2. The storage unit 33 includes a hard disk, for example, and stores a variety of programs and data, used by the controller 31. The programs include Web server software. The storage unit 33 stores a user management table 331 that is used to manage user related information.

FIG. 4 illustrates an example of the user management table 331. The user management table 331 stores account information, a token of each service providing apparatus 10, and the state of the token in association with each other. The account information is used to log on to the relay apparatus 30. The account information includes a user ID and a password. The user ID may be a user name of a user or a mail address assigned to the user. The token is information indicating a right to access the service providing apparatus 10. The tokens are issued on a per user basis, and are stored on the user management table 331. The state of a token indicates whether the token is registered or indicates the validity of the token. For example, if a token is stored in the user management table 331, a state "present" is stored. If a token is not stored in the user management table 331, a state "absent" is stored. If a token has expired, a state "expired" is stored.

As illustrated in FIG. 4, the user management table 331 lists the state "absent" of the token of the service providing apparatus 10A, the state "absent" of the token of the service providing apparatus 10B, and the state "absent" of the token of the service providing apparatus 10C in association with a user ID "User01@aaa.example.com". This means that the tokens of the user having the user ID "User01@aaa.example.com" to access the service providing apparatuses 10A through 10C are not registered on the relay apparatus 30.

Figure 5:
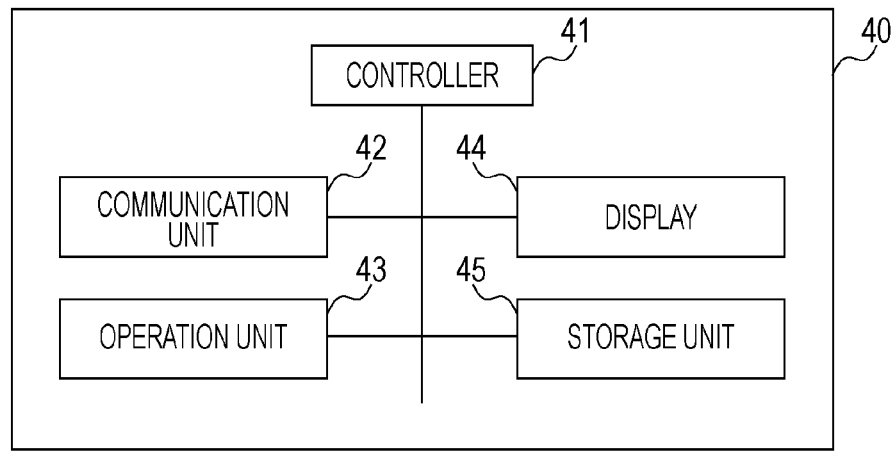
FIG. 5 illustrates a hardware configuration of a right registration apparatus.

FIG. 5 illustrates a hardware configuration of the right registration apparatus 40. The right registration apparatus 40 includes a controller 41, a communication unit 42, an operation unit 43, a display 44, and a storage unit 45.

The controller 41 includes a CPU and a memory, for example, and controls elements in the right registration apparatus 40. The CPU executes a program stored on the memory or the storage unit 45. The memory includes a ROM and a RAM. The ROM pre-stores a program or data. The RAM temporarily stores a program and data, and serves as a working area when the CPU executes the program.

The communication unit 42 is a communication interface connected to the communication line 2. The communication unit 42 communicates with the relay apparatus 30 and the service providing apparatus 10 via the communication line 2. The operation unit 43 includes a keyboard and a mouse, for example, and inputs to the controller 41 information responsive to a user operation. The display 44 includes a liquid-crystal display, for example, and displays a variety of information. The storage unit 45 includes a hard disk, for example, and stores a variety of programs and data, used by the controller 41. The programs include a Web browser.

Figure 6:
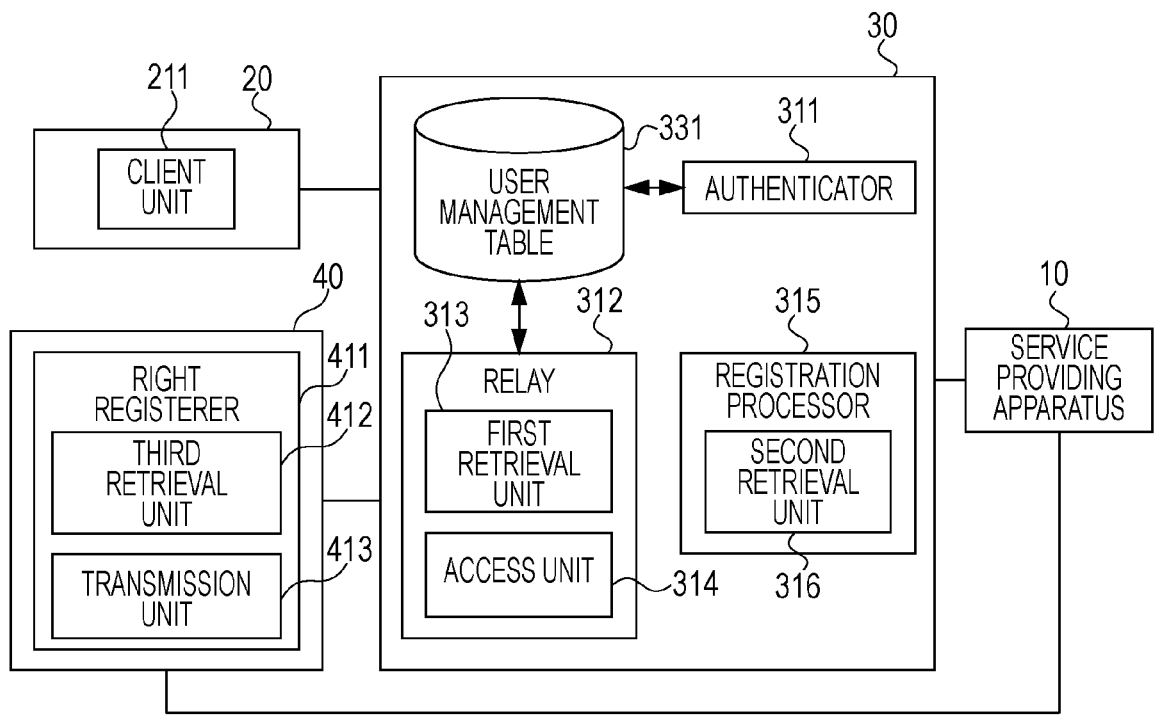
FIG. 6 illustrates a functional configuration of a relay system.

FIG. 6 illustrates a functional configuration of the relay system 1. The client apparatus 20 has a function of a client unit 211, for example. The function of the client unit 211 is implemented when the CPU of the controller 21 executes the program thereof. The client unit 211 performs an operation to receive a service provided by the service providing apparatus 10.

The relay apparatus 30 has functions of an authenticator 311, a relay 312, a first retrieval unit 313, an access unit 314, a registration processor 315, and a second retrieval unit 316. The functions of these elements are implemented when the CPU of the controller 31 executes the program thereof. The authenticator 311 authenticates the user by referencing the user management table 331 in response to a log-in request from the client apparatus 20. The relay 312 relays data between the service providing apparatus 10 and each of the client apparatus 20 and the right registration apparatus 40.

The first retrieval unit 313 retrieves identification information of a user registered on the service providing apparatus 10 that is a target of an access request from the client apparatus 20. The identification information is credit information of the user, including a user ID and a password, for example. If the storage unit 33 does not store right information to access the service providing apparatus 10 as a target, the access unit 314 accesses the service providing apparatus 10 as the target using the identification information retrieved by the first retrieval unit 313 instead of the right information. The right information is a token, for example. The registration processor 315 performs a registration operation of a token in response to a request from the client apparatus 20. The second retrieval unit 316 retrieves from the service providing apparatus 10 the right information indicating a right to access the service providing apparatus 10.

The right registration apparatus 40 includes a right registerer 411, a third retrieval unit 412, and a transmission unit 413. The functions of these elements are implemented when the CPU of the controller 41 executes the program thereof. In concert with the relay apparatus 30, the right registerer 411 registers on the relay apparatus 30 the right information indicating the right to access the service providing apparatus 10. The third retrieval unit 412 retrieves from the service providing apparatus 10 permission information to permit retrieving the right information indicating the right to access the service providing apparatus 10. The permission information is a code that permits retrieving a token, for example. The transmission unit 413 transmits the permission information retrieved by the third retrieval unit 412 to the relay apparatus 30.

Data may be exchanged between the client apparatus 20, the relay apparatus 30, the service providing apparatus 10, and the right registration apparatus 40 in accordance with hypertext transfer protocol (HTTP). The relay apparatus 30 and the service providing apparatus 10 may present a screen on the client apparatus 20 or the right registration apparatus 40 using the function of a Web server. In such a case, the client apparatus 20 and the right registration apparatus 40 display the screen using the function of the Web browser.

A process of the relay system 1 is described below. In the relay system 1, the user may use the client apparatus 20 to store data on the service providing apparatus 10 via the relay apparatus 30 or to retrieve data from the service providing apparatus 10 via the relay apparatus 30. The relay apparatus 30 accesses the service providing apparatus 10 using a pre-registered token. There may be times when a token to access the service providing apparatus 10 is not registered on the relay apparatus 30. For example, no token may be registered on the relay apparatus 30 or a token registered on the relay apparatus 30 have expired. The process of the relay system 1 to be performed in such a case is described below.

Figure 7:
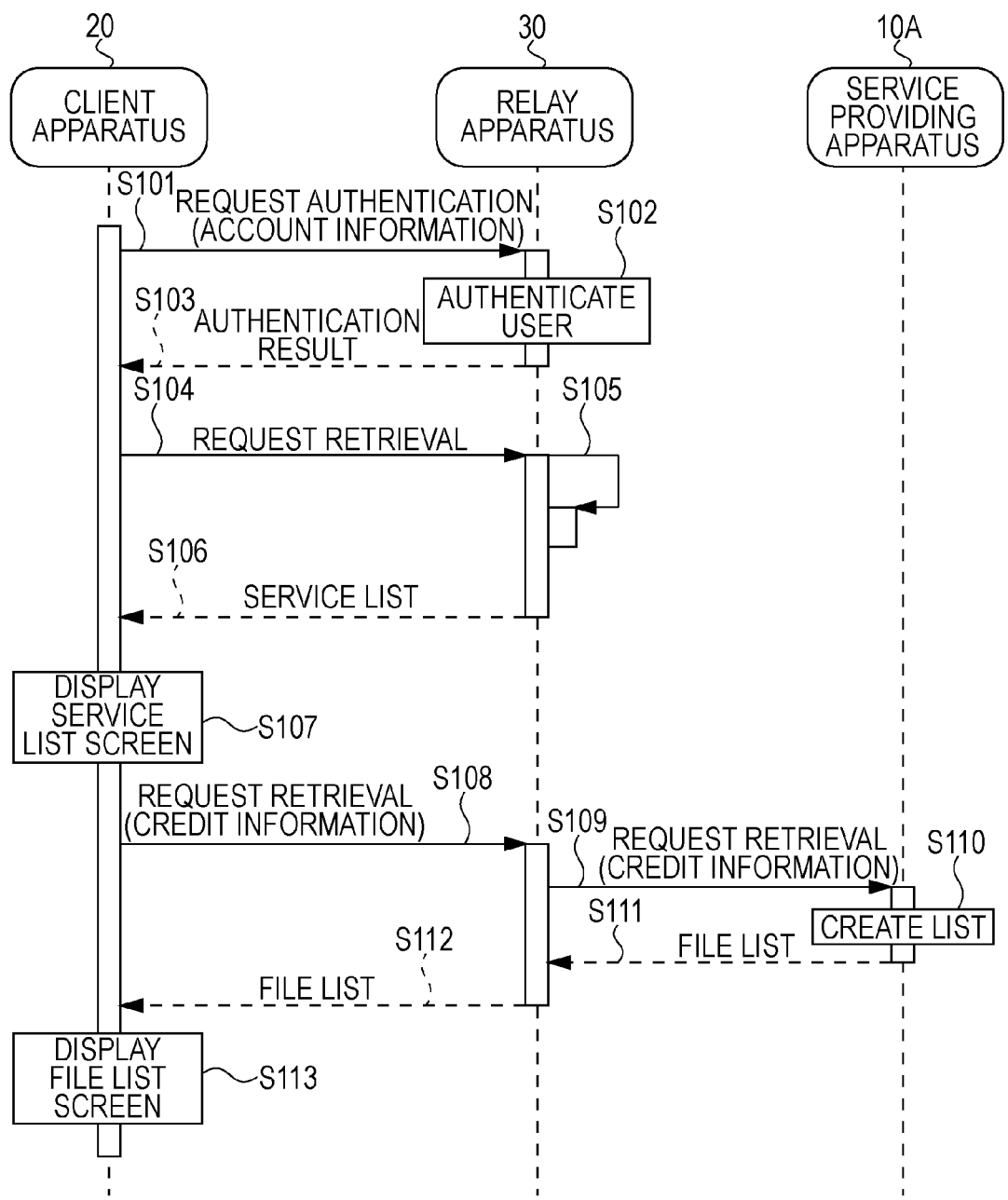
FIG. 7 is a sequence chart illustrating an operation that is performed if no token is registered on the relay apparatus.

The operation performed with no token registered on the relay apparatus 30 is described below. FIG. 7 is a sequence chart illustrating the operation with no token registered on the relay apparatus 30. The operation herein is based on the premise that the relay apparatus 30 is registered to be mutually in concert with each of the service providing apparatuses 10A through 10C.

The user first logs on to the relay apparatus 30 using the client apparatus 20 to use a service provided by the service providing apparatus 10. More specifically, the user enters account information to log on to the relay apparatus 30 by operating the operation unit 23. For example, if the account information to log on to the relay apparatus 30 is a user ID "User01@aaa.example.com" and a password "password01", the user enters the user ID "User01@aaa.example.com" and the password "password01".

In step S101, the client unit 211 in the client apparatus 20 transfers to the relay apparatus 30 via the communication unit 22 an authentication request including the account information input by the user. The relay apparatus 30 receives the authentication request via the communication unit 32.

In step S102, the authenticator 311 in the relay apparatus 30 performs a user authentication operation in response to the authentication request from the client apparatus 20. More specifically, the authenticator 311 performs the user authentication operation based on whether the account information included in the authentication request is stored on the user management table 331. If the account information included in the authentication request is stored on the user management table 331, the user authentication operation is successful. If the account information included in the authentication request is not stored on the user management table 331, the user authentication operation is unsuccessful. Since a combination of the user ID "User01@aaa.example.com" and the password "password01" included in the authentication request is stored on the user management table 331 of FIG. 4, the user authentication operation is successful. The authenticator 311 causes the user ID to be stored on the memory. The user ID stored on the memory is used as the user ID of a login user.

In step S103, the authenticator 311 transmits an authentication result of the user authentication operation performed in step S102 to the client apparatus 20 via the communication unit 32. The client apparatus 20 receives the authentication result via the communication unit 22. Upon receiving the authentication result indicating a successful user authentication operation, the client apparatus 20 proceeds to step S104. On the other hand, upon receiving the authentication result indicating an unsuccessful user authentication operation, the client apparatus 20 quits the process without performing subsequent operations. Since the client apparatus 20 receives the authentication result indicating a successful user authentication operation in this case, processing proceeds to step S104.

In step S104, the client unit 211 in the client apparatus 20 transmits to the relay apparatus 30 via the communication unit 22 a retrieval request of a service list listing a service provided by the service providing apparatus 10 pre-registered to be concert with the relay apparatus 30. The relay apparatus 30 receives the retrieval request via the communication unit 32.

In step S105, the relay 312 in the relay apparatus 30 creates a service list in response to the retrieval request received from the client apparatus 20. The service list lists identification information of all the service providing apparatuses 10 pre-registered to be in concert with the relay apparatus 30, and states of tokens of the login user to access these service providing apparatuses 10.

Since the relay apparatus 30 is pre-registered to be in concert with the service providing apparatuses 10A through 10C in this example, the identification information of the service providing apparatuses 10A through 10C is thus listed in the service list. In this example as well, the user management table 331 of FIG. 4 stores the user ID "User01@aaa.example.com" of the login user, stored on the memory, in association with the token state "absent" of the service providing apparatus 10A, the token state "absent" of the service providing apparatus 10B, and the token state "absent" of the service providing apparatus 10C. The service list thus lists the states of the tokens.

In step S106, the relay 312 transmits the service list created in step S105 to the client apparatus 20 via the communication unit 32. The client apparatus 20 receives the service list via the communication unit 22.

In step S107, the client unit 211 in the client apparatus 20 causes the display 24 to display a service list screen 241 in accordance with the service list received from the relay apparatus 30.

Figure 8:
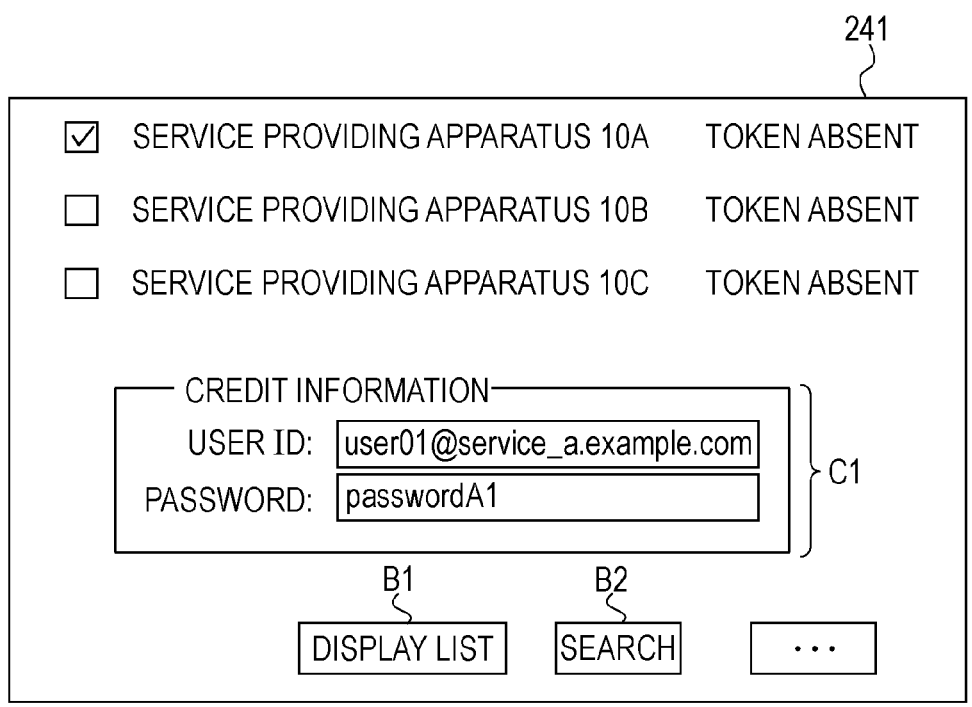
FIG. 8 illustrates an example of a service list screen.

FIG. 8 illustrates an example of the service list screen 241. The service list screen 241 displays the service list received from the relay apparatus 30. The user may select from the service list the service providing apparatus 10 that provides a desired service. For example, the user may desire to use a service provided by the service providing apparatus 10A. The user selects the service providing apparatus 10A by operating the operation unit 23.

The service list screen 241 displays input boxes C1 that are used to enter credit information. If the token state of the selected service providing apparatus 10 is "absent", the user enters the credit information pre-registered on the service providing apparatus 10 into the input boxes C1 using the operation unit 23. Since the token state of the service providing apparatus 10A is "absent" in this case, the user enters into the input boxes C1 the credit information pre-registered on the service providing apparatus 10A by operating the operation unit 23. For example, if the user credit information pre-registered on the service providing apparatus 10A is a user ID "user01@service_a.example.com" and a password "passwordA1", the user enters the user ID "user01@service_a.example.com" and the password "passwordA1" into the input boxes C1.

The service list screen 241 displays buttons that are used to give an execution instruction of a variety of processes that are to be performed by the service providing apparatus 10. For example, the user may desire to view a list of available data stored on the service providing apparatus 10A. The user then presses a display list button B1 using the operation unit 23. If the display list button B1 is pressed with the credit information entered, the client apparatus 20 proceeds to step S108.

In step S108, the client unit 211 transmits to the relay apparatus 30 via the communication unit 22 a retrieval request of a file list of the service providing apparatus 10 selected on the service list screen 241. The retrieval request includes the identification information of the service providing apparatus 10 selected on the service list screen 241 and the credit information entered in the input boxes C1. In this example, the retrieval request includes the identification information of the service providing apparatus 10A, the user ID "user01@service_a.example.com" and the password "passwordA1". The relay apparatus 30 receives the retrieval request via the communication unit 32. The first retrieval unit 313 retrieves the credit information from the retrieval request and causes the right information to be stored on a memory, such as a RAM whose storage contents are deleted by a power interruption, for example.

In step S109, the access unit 314 in the relay apparatus 30 transfers the retrieval request received from the client apparatus 20 to the service providing apparatus 10 as a target via the communication unit 32. The access unit 314 then accesses the service providing apparatus 10 using the credit information stored on the memory. In this example, the retrieval request includes the identification information of the service providing apparatus 10A, the user ID "user01@service_a.example.com", and the password "passwordA1". The access unit 314 thus accesses the service providing apparatus 10A using the user ID "user01@service_a.example.com", and the password "passwordA1".

In response to an access using the credit information, the service providing apparatus 10A determines whether to permit the access from the relay apparatus 30 based on whether the credit information has been registered or not. If the credit information included in the retrieval request has been registered, the service providing apparatus 10A permits the relay apparatus 30 to access thereto, and proceeds to step S110. On the other hand, if the credit information included in the retrieval request has not been registered, the service providing apparatus 10A denies the relay apparatus 30 the access. The service providing apparatus 10A ends the process without performing subsequent steps. Since the user ID "user01@service_a.example.com", and the password "passwordA1" included in the retrieval request are registered on the service providing apparatus 10A in this case, the service providing apparatus 10A permits the relay apparatus 30 to access thereto and proceeds to step S110.

In step S110, the service providing apparatus 10A creates a file list in response to the retrieval request received from the relay apparatus 30. The file list includes the identification information of all data available to the user out of the data stored on the service providing apparatus 10A. In this example, the file list includes the identification information of all the data available to the user of the user ID "user01@service_a.example.com". Whether data is available to the user or not is determined based on attribute information added to the data. For example, if the user ID "user01@service_a.example.com" or a user ID corresponding thereto is added to data, the data is determined to be available to the user.

In step S111, the service providing apparatus 10A transmits the file list created in step S110 to the relay apparatus 30. The relay apparatus 30 receives the file list via the communication unit 32.

In step S112, the relay 312 in the relay apparatus 30 transfers the file list received from the service providing apparatus 10A to the client apparatus 20 via the communication unit 32. The client apparatus 20 receives the file list via the communication unit 22.

In step S113, the client unit 211 in the client apparatus 20 causes the display 24 to display a file list screen based on the file list received from the relay apparatus 30. The file list screen displays the file list.

When data is selected from the file list in response to a user operation, the client apparatus 20 retrieves the selected data from the service providing apparatus 10A via the relay apparatus 30 in the same steps as steps S108 through S112. The access unit 314 in the relay apparatus 30 then accesses the service providing apparatus 10A using the credit information stored on the memory in step S108. The data retrieved from the service providing apparatus 10A is used in an image forming operation performed by the image forming unit 27.

The operation performed with the token registered on the relay apparatus 30 expired is described below. FIG. 9 is a sequence chart of the operation performed when the token registered on the relay apparatus 30 has expired. Note that the storage unit 33 stores the user management table 331 of FIG. 10 instead of the user management table 331 of FIG. 4.

The user management table 331 of FIG. 10 stores the user ID "User01@aaa.example.com" in association with the token state "present" of the service providing apparatus 10A, the token state "present" of the service providing apparatus 10B, and the token state "present" of the service providing apparatus 10C. This means that the tokens of the user having the user ID "User01@aaa.example.com" to access the service providing apparatuses 10A through 10C are all registered on the relay apparatus 30.

Operations in steps S201 through S207 of FIG. 9 are respectively identical to operations in steps S101 through S107. In step S205, however, the service list is created based on the user management table 331 of FIG. 10. The user management table 331 of FIG. 10 stores the user ID "User01@aaa.example.com" of the login user stored on the memory in association with the token state "present" of the service providing apparatus 10A, the token state "present" of the service providing apparatus 10B, and the token state "present" of the service providing apparatus 10C. The service list lists the states of these tokens.

In step S207, the service list screen 241 is displayed in accordance with the service list. FIG. 11 illustrates part of the service list screen 241 then displayed. The service providing apparatus 10A is selected in the example of FIG. 11. Since the token state of the service providing apparatus 10A is "present", the user does not enter the credit information at this phase of operation.

In step S208, the client unit 211 transmits to the relay apparatus 30 via the communication unit 22 the retrieval request of the file list of the service providing apparatus 10 selected on the service list screen 241. The retrieval request includes the identification information of the service providing apparatus 10 selected on the service list screen 241. Since no credit information is entered on the service list screen 241 in the example, no right information is included in the retrieval request unlike in step S108.

In step S209, the access unit 314 in the relay apparatus 30 transfers the retrieval request received from the client apparatus 20 to the service providing apparatus 10 as a target via the communication unit 32. Unlike in step S109, the access unit 314 reads from the user management table 331 the token of the login user to access the service providing apparatus 10 and then accesses the service providing apparatus 10 using the read token. In the example, the access unit 314 reads from the user management table 331 of FIG. 10 a token A1 of the service providing apparatus 10A stored in association with the user ID "User01@aaa.example.com" of the login user stored on the memory, and then accesses the service providing apparatus 10A using the token A1.

In response to the access of the relay apparatus 30 using the token A1, the service providing apparatus 10A determines whether to permit the access of the relay apparatus 30 based on the validity of the token A1. Each token has an expiration date set thereon. If the token A1 is valid and yet to expire, the service providing apparatus 10A permits the relay apparatus 30 to access thereto. If the token A1 has expired and is not valid, the service providing apparatus 10A denies the relay apparatus 30 the access. The token A1 has expired, and is thus invalid herein.

If the service providing apparatus 10A denies the relay apparatus 30 the access in step S210, the relay apparatus 30 fails to retrieve the file list. In this way, the relay apparatus 30 determines that the token A1 of the login user to access the service providing apparatus 10A has expired.

In step S211, the relay 312 in the relay apparatus 30 updates the user management table 331 in response to the determination. FIG. 12 illustrates an example of the updated user management table 331. Since the service providing apparatus 10A denies the relay apparatus 30 the access using the token A1, the token A1 is considered to have expired. As illustrated in FIG. 12, the relay 312 updates the state of the token A1 of the login user stored on the user management table 331 from "present" to "expired".

In step S212, in response to the expiration of the token, the relay 312 transmits to the client apparatus 20 via the communication unit 32 an error notification indicative of a retrieval failure of the file list of the service providing apparatus 10A. The client apparatus 20 receives the error notification via the communication unit 22.

Operations in steps S213 through S216 are respectively identical to operations in steps S204 through S207. However, note that in step S214 the relay apparatus 30 creates the service list based on the user management table 331 updated in step S212. The updated user management table 331 of FIG. 12 stores the user ID "User01@aaa.example.com" of the login user, stored on the memory, in association with the token state "expired" of the service providing apparatus 10A, the token state "present" of the service providing apparatus 10B, and the token state "present" of the service providing apparatus 10C. The service list thus lists the states of these tokens.

In step S216, the service list screen 241 is displayed based on the service list. FIG. 13 illustrates an example of the service list screen 241. In the service list screen 241 of FIG. 13, the state of the token of the service providing apparatus 10A is "expired". In order to select the service providing apparatus 10A, the user enters the credit information stored on the service providing apparatus 10A into the input boxes C1 using the operation unit 23. For example, if the user credit information registered on the service providing apparatus 10A is a user ID "user01@service_a.example.com" and a password "passwordA1", the user enters the user ID "user01@service_a.example.com" and the password "passwordA1" into the input boxes C1. Subsequent operations are identical to those in steps S108 through S113.

Figure 14:
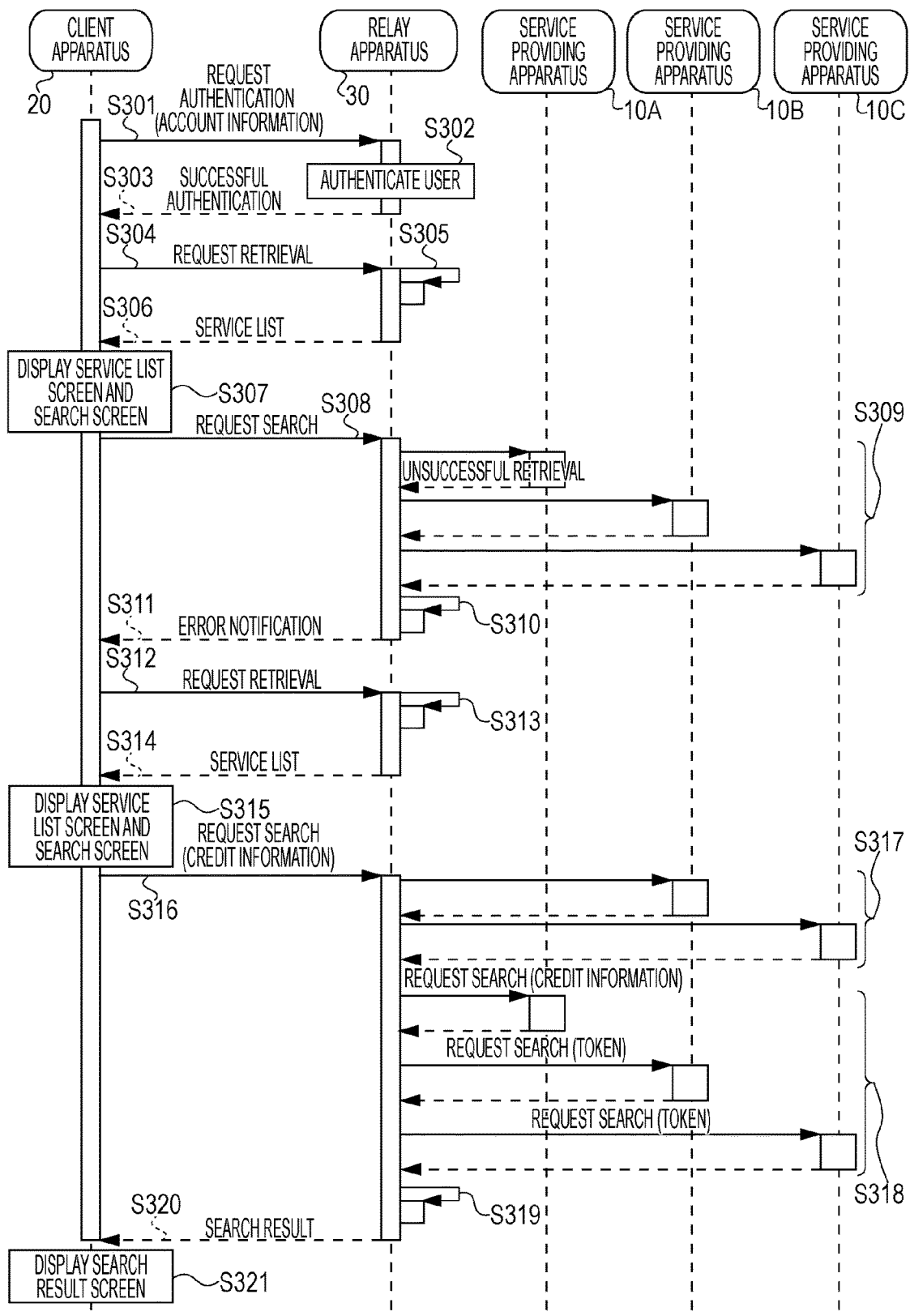
FIG. 14 illustrates a sequence chart of an operation performed when a metasearch is performed with the token registered on the relay apparatus expired.

An operation in metasearch performed with an expired token on the relay apparatus 30 is described below. The metasearch refers to the searching that is simultaneously performed on multiple service providing apparatuses 10 for data at a time according to the same search criteria. FIG. 14 illustrates a sequence chart of the operation performed when the metasearch is performed with the token registered on the relay apparatus 30 expired. Note that the user management table 331 of FIG. 10 is stored on the storage unit 33.

Operations in steps S301 through S306 are respectively identical to those in steps S101 through S106. In step S307, as in step S107 described above, the client unit 211 in the client apparatus 20 causes the display 24 to display the service list screen 241 based on the service list received from the relay apparatus 30. In this example, the service list screen 241 illustrated in FIG. 11 is displayed. In order to metasearch the service providing apparatuses 10A through 10C, the user selects the service providing apparatuses 10A through 10C using the operation unit 23, and then presses a search button B2. As illustrated in FIG. 11, the states of the tokens of the service providing apparatuses 10A through 10C are all "present", and the user does not enter the credit information at this phase of operation.

Figure 15:
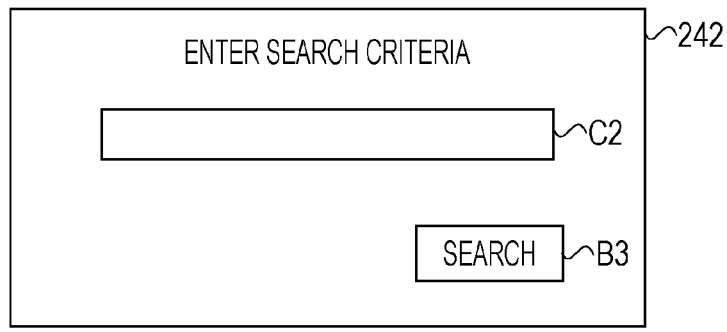
FIG. 15 illustrates an example of a search screen.

With the search button B2 pressed, the display 24 transitions from the service list screen 241 to a search screen 242. FIG. 15 illustrates an example of the search screen 242. The search screen 242 displays an input box C2 that receives a search criteria, and a search button B3. Using the operation unit 23, the user enters the search criteria into the input box C2, and then presses the search button B3. With the search button B3 pressed, the client apparatus 20 proceeds to step S308.

In step S308, the client unit 211 transmits to the relay apparatus 30 via the communication unit 22 a search request intended for the service providing apparatus 10 selected on the service list screen 241. The search request includes the identification information of the service providing apparatus 10 selected on the service list screen 241, and the search criteria entered on the search screen 242. The relay apparatus 30 receives the search request via the communication unit 32.

In step S309, the relay 312 verifies the validity of the token of the service providing apparatus 10 having the token state "present" of the login user stored on the user management table 331, out of the service providing apparatuses 10 selected on the service list screen 241. More specifically, the relay 312 transmits a retrieval request of information to the service providing apparatus 10 as a target via the communication unit 32. The information as a target of the retrieval request may be any information as long as the information is stored on the service providing apparatus 10. For example, if user information is stored on the service providing apparatus 10, the user information is the target of the retrieval request.

The retrieval request includes the identification information of the service providing apparatuses 10A through 10C selected on the service list screen 241. The user management table 331 of FIG. 10 stores the state "present" as the states of the tokens of the service providing apparatuses 10A through 10C in association with the user ID "User01@aaa.example.com" of the login user. In this case, the retrieval request of information is transmitted to each of the service providing apparatuses 10A through 10C.

The relay 312 reads from the user management table 331 the tokens of the login user to access the service providing apparatuses 10A through 10C, and then accesses the service providing apparatuses 10A through 10C using the read tokens. As illustrated in FIG. 10, the user management table 331 of FIG. 4 stores the user ID "User01@aaa.example.com" of the login user, stored on the memory, in association with a token A1 of the service providing apparatus 10A, a token B1 of the service providing apparatus 10B, and a token C1 of the service providing apparatus 10C. The relay 312 accesses the service providing apparatuses 10A through 10C using the tokens A1, B1, and C1, respectively.

In response to the access of the relay apparatus 30 using the tokens A1, B1, and C1, the service providing apparatuses 10A through 10C determines the validity of each of the tokens A1, B1, and C1. If a token has not expired, the service providing apparatus 10 determines that the token is valid. If a token has expired, the service providing apparatus 10 determines that the token is invalid.

The operation herein is based on the premise that the tokens B1 and C1 have not expired yet, but that the token A1 has expired. The service providing apparatuses 10B and 10C permit the relay apparatus 30 to access thereto, and transmit the target information to the relay apparatus 30 in response to the retrieval request received from the relay apparatus 30. Upon receiving the information from the service providing apparatuses 10B and 10C, the relay apparatus 30 determines that the tokens of the service providing apparatuses 10B and 10C are valid. On the other hand, the service providing apparatus 10A denies the relay apparatus 30 the access. The relay apparatus 30 thus fails to retrieve information from the service providing apparatus 10A. The relay apparatus 30 thus determines that the token A1 of the service providing apparatus 10A has expired.

In step S310, the relay 312 in the relay apparatus 30 updates the user management table 331 in the same manner as in step S211. Since the relay apparatus 30 is denied the access using the token A1 in this example, the token A1 is considered to be invalid. As illustrated in FIG. 12, the relay 312 updates the state of the token A1 of the login user stored on the user management table 331 from "present" to "expired".

In step S311, in the same manner as in step S212, the relay 312 transmits to the client apparatus 20 via the communication unit 32 an error notification indicating a failure to retrieve information of the service providing apparatus 10A. The client apparatus 20 receives the error notification via the communication unit 22.

Operations to be performed in steps S312 through S315 are identical to operations in steps S304 through S307, respectively. However, note that in step S313 the service list is created based on the user management table 331 updated in step S310. In this example, the user management table 331 of FIG. 12 stores the user ID "User01@aaa.example.com" of the login user, stored on the memory, in association with the token state "expired" of the service providing apparatus 10A, the token state "present" of the service providing apparatus 10B, and the token state "present" of the service providing apparatus 10C. The service list thus lists the states of these tokens.

In step S315, the display 24 displays the service list screen 241 of FIG. 13 based on the service list. The user selects the service providing apparatuses 10A through 10C on the service list screen 241 using the operation unit 23. The token of the service providing apparatus 10A, out of the tokens of the service providing apparatuses 10A through 10C, is "expired". In such a case, the user enters the credit information registered on the service providing apparatus 10A. For example, if the user credit information registered on the service providing apparatus 10A is a user ID "user01@service_a.example.com" and a password "passwordA1", the user enters the user ID "user01@service_a.example.com" and the password "passwordA1" into the input boxes C1.

In the same manner as in step S308 described above, in step S316, the client unit 211 transmits to the relay apparatus 30 via the communication unit 22 a search request intended for the service providing apparatus 10 selected on the service list screen 241. The search request is different from the search request in step S308 in that the credit information entered in the input boxes C1 is included in addition to the identification information of the service providing apparatus 10 selected on the service list screen 241 and the search criteria entered on the search screen 242. In this example, the search criteria to be transmitted to the relay apparatus 30 includes the identification information of the service providing apparatuses 10A through 10C, the search criteria, the user ID "user01@service_a.example.com", and the password "passwordA1". The relay apparatus 30 receives the retrieval request via the communication unit 32. The first retrieval unit 313 retrieves the credit information included in the retrieval request, and causes the credit information to be stored on the memory, such as a RAM, which deletes the contents thereof in response to a power interruption.

In the same manner as in step S309 described above, in step S317, the relay 312 verifies the validity of the token of the service providing apparatus 10 having the token state "present" of the login user stored on the user management table 331, out of the service providing apparatuses 10 selected on the service list screen 241. However, note that the validity of the token is verified herein using the user management table 331 updated in step S310.

In this example, the search request includes the identification information of the service providing apparatuses 10A through 10C selected on the service list screen 241. In this example, the updated user management table 331 of FIG. 12 stores the user ID "User01@aaa.example.com" of the login user, stored on the memory, in association with the token state "expired" of the service providing apparatus 10A, the token state "present" of the service providing apparatus 10B, and the token state "present" of the service providing apparatus 10C. The token validity verification is performed on the service providing apparatuses 10B and 10C but is not performed on the service providing apparatus 10A. Since the tokens B1 and C1 of the service providing apparatuses 10B and 10C are valid as described with reference to step S309. The service providing apparatuses 10B and 10C thus return information as a target in response to the retrieval request.

In step S318, the relay 312 transfers via the communication unit 32 the search request received from the client apparatus 20 to the service providing apparatus 10 selected on the service list screen 241. Since the search request includes the identification information of the service providing apparatuses 10A through 10C selected on the service list screen 241 in this example, the search request is transferred to the service providing apparatuses 10A through 10C.

Since the tokens of the service providing apparatuses 10B and 10C are verified to be valid in step S317, the relay 312 accesses the service providing apparatuses 10B and 10C as in step S317 using the token B1 and C1 of the login user. On the other hand, since the token A1 of the login user for the service providing apparatus 10A has expired, the relay 312 accesses the service providing apparatus 10A using the credit information stored on the memory. The service providing apparatus 10A corresponds to a first service providing apparatus that does not permit the access using the token, and the service providing apparatuses 10B and 10C correspond to a second service providing apparatus other than the first service providing apparatus.

In response to the access of the relay apparatus 30 using the credit information, the service providing apparatus 10A determines whether to permit the relay apparatus 30 to access thereto depending on whether the credit information is registered or not. If the credit information included in the retrieval request is registered, the service providing apparatus 10A permits the relay apparatus 30 to access thereto. On the other hand, if the credit information included in the retrieval request is not registered, the service providing apparatus 10A denies the relay apparatus 30 the access, and ends the process without performing subsequent steps. Since the user ID "user01@service_a.example.com", and the password "passwordA1" included in the retrieval request are registered on the service providing apparatus 10A, the service providing apparatus 10A permits the relay apparatus 30 to access thereto. Since the tokens B1 and C1 of the service providing apparatuses 10B and 10C are valid in this example, the service providing apparatuses 10B and 10C permit the relay apparatus 30 to access thereto.

The service providing apparatuses 10A through 10C search for data in response to the search request from the relay apparatus 30. More specifically, the service providing apparatuses 10A through 10C search for data that matches the search criteria included the search request. The service providing apparatuses 10A through 10C transmit search results of the data to the relay apparatus 30. The relay apparatus 30 then receives the search results via the communication unit 32.

In step S319, the relay 312 in the relay apparatus 30 merges the search results received from the service providing apparatuses 10A through 10C.

In step S320, the relay 312 transmits the search results merged in step S319 to the client apparatus 20 via the communication unit 32. The client apparatus 20 receives the search results via the communication unit 22.

In step S321, the client unit 211 in the client apparatus 20 causes the display 24 to display a search result screen based on the search results received from the relay apparatus 30. The search result screen displays the search results.

When the user selects data from the search results, the client apparatus 20 retrieves the selected data from one of the service providing apparatuses 10A through 10C via the relay apparatus 30 in the same operations described with reference to steps S108 through S112. For example, to retrieve data from the service providing apparatus 10A, the access unit 314 in the relay apparatus 30 accesses the service providing apparatus 10A using the credit information stored on the memory in step S316. The image forming unit 27 uses the data retrieved from the service providing apparatuses 10A through 10C to form an image.

Figure 16:
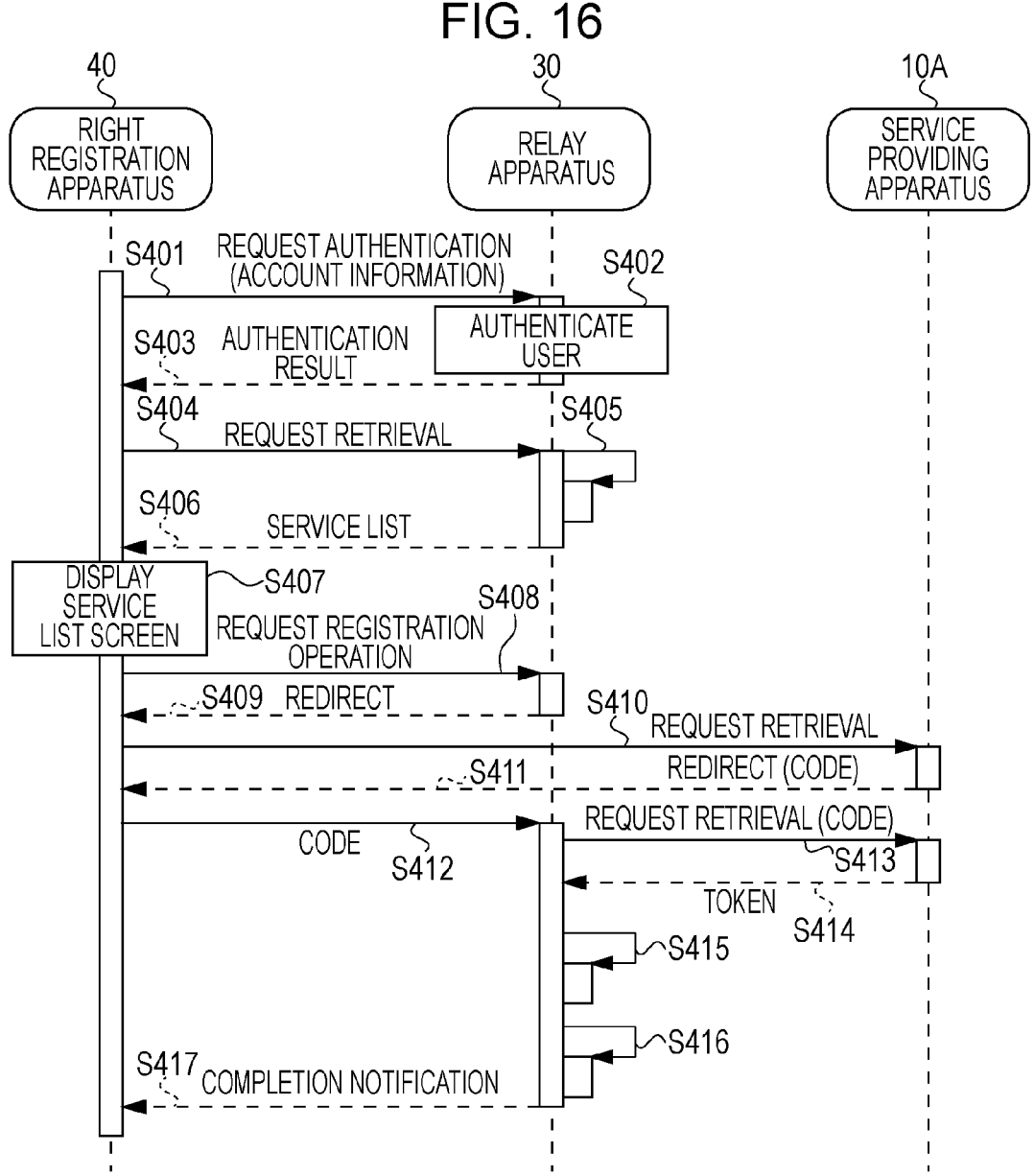
FIG. 16 illustrates a sequence chart of an operation performed to register a token on the relay apparatus.

If no token is registered on the relay apparatus 30 or a token registered on the relay apparatus 30 has expired, the user may register a new token on the relay apparatus 30 using the right registration apparatus 40. FIG. 16 illustrates a sequence chart of the operation performed to register a token on the relay apparatus 30. The operation is performed on the premise that the user management table 331 of FIG. 12 is stored on the storage unit 33.

The user management table 331 of FIG. 12 stores the token state "expired" of the service providing apparatus 10A in association with the user ID "User01@aaa.example.com". This means that the token of the user having the user ID "User01@aaa.example.com" to access the service providing apparatus 10A has expired.

To register a token on the relay apparatus 30, the user first logs on to the relay apparatus 30 using the right registration apparatus 40. More specifically, the user enters account information using the operation unit 43 to log on to the relay apparatus 30. If the account information to log on to the relay apparatus 30 is a user ID "User01@aaa.example.com" and a password "password01", the user enters the user ID "User01@aaa.example.com" and the password "password01".

In step S401, the right registerer 411 in the right registration apparatus 40 transmits to the relay apparatus 30 via the communication unit 42 an authentication request entered by a user operation. The relay apparatus 30 receives the authentication request via the communication unit 32.

In the same manner as in step S102 described above, in step S402, the authenticator 311 in the relay apparatus 30 performs an authentication operation received from the right registration apparatus 40.

In step S403, the authenticator 311 transmits authentication results of the user authentication to the right registration apparatus 40 via the communication unit 32. The right registration apparatus 40 receives the authentication results via the communication unit 42. Upon receiving the authentication results indicating successful user authentication, the right registration apparatus 40 proceeds to step S404. On the other hand, upon receiving the authentication results indicating unsuccessful user authentication, the right registration apparatus 40 ends the process without performing subsequent operations. Since the authentication results indicating successful user authentication are received herein, the right registration apparatus 40 proceeds to step S404.

In step S404, the right registerer 411 in the right registration apparatus 40 transmits to the relay apparatus 30 via the communication unit 42 a retrieval request of a service list indicating a list of services provided by the service providing apparatus 10 pre-registered to be in concert with the relay apparatus 30. The relay apparatus 30 receives the retrieval request via the communication unit 32.

In the same manner as in step S105 described above, in step S405, the registration processor 315 in the relay apparatus 30 creates the service list in response to the retrieval request received from the right registration apparatus 40.

In step S406, the registration processor 315 transmits the service list created in step S405 to the right registration apparatus 40 via the communication unit 32. The right registration apparatus 40 receives the service list via the communication unit 42.

In step S407, the right registerer 411 in the right registration apparatus 40 causes the display 44 to display a service list screen 243 in accordance with the service list received from the relay apparatus 30.

Figure 17:
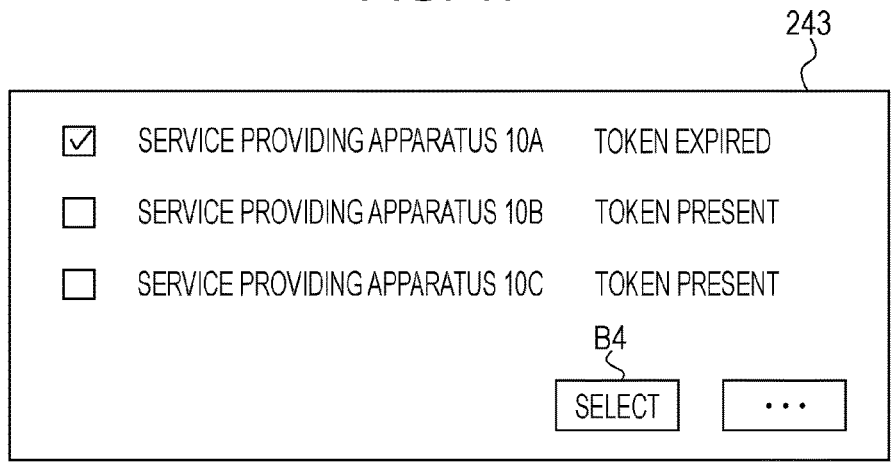
FIG. 17 illustrates an example of the service list screen.

FIG. 17 illustrates an example of the service list screen 243. The service list screen 243 displays the service list listing the states of the tokens of the service providing apparatuses 10A through 10C. The user selects from the service list the service providing apparatus 10 as an issuer of a token to be newly registered on the relay apparatus 30. The state of the token of the service providing apparatus 10A is "expired" in the service list screen 243 of FIG. 17. In this case, the user registers a valid token of the service providing apparatus 10A on the relay apparatus 30. More specifically, using the operation unit 43, the user selects the service providing apparatus 10A and then presses a select button B4.

With the select button B4 pressed, the right registration apparatus 40 proceeds to step S408.

In step S408, the right registerer 411 transmits to the relay apparatus 30 via the communication unit 42 a registration operation request of a token to be issued by the service providing apparatus 10 selected on the service list screen 243. The registration operation request includes the identification information of the service providing apparatus 10 selected on the service list screen 243. Since the service providing apparatus 10A is selected on the service list screen 243 herein, the registration operation request includes the identification information of the service providing apparatus 10A. The relay apparatus 30 receives the registration operation request via the communication unit 32.

In step S409, the registration processor 315 in the relay apparatus 30 redirects the access destination of the right registration apparatus 40 to the service providing apparatus 10 selected on the service list screen 243. More specifically, the registration processor 315 transmits to the right registration apparatus 40 via the communication unit 32 a response to notify the right registration apparatus 40 of a uniform resource locator (URL) of the service providing apparatus 10 selected on the service list screen 243 as a movement destination. Since the registration operation request includes the identification information of the service providing apparatus 10A selected on the service list screen 243 in this example, the registration processor 315 transmits to the right registration apparatus 40 the response that notifies the right registration apparatus 40 of the URL of the service providing apparatus 10A as the movement destination. Note that the response also includes a URL of the relay apparatus 30. The right registration apparatus 40 receives the response via the communication unit 42.

In step S410, the third retrieval unit 412 in the right registration apparatus 40 transmits via the communication unit 42 a retrieval request of a code permitting the retrieval of the token to the service providing apparatus 10 as a redirect destination. In this example, the response received from the relay apparatus 30 is used to notify the right registration apparatus 40 of the URL of the service providing apparatus 10A as the movement destination. The retrieval request is thus transmitted to the service providing apparatus 10A. The retrieval request includes the URL of the relay apparatus 30 included in the response.

In step S411, the service providing apparatus 10A issues the code to permit the retrieval of the token in response to the retrieval request received from the relay apparatus 30, and redirects an access destination of the right registration apparatus 40 to the relay apparatus 30. More specifically, the service providing apparatus 10A transmits first a login request to the right registration apparatus 40. In response to the request, the user enters a user ID and a password to log on to the service providing apparatus 10A by operating the operation unit 43. The right registration apparatus 40 transmits the user ID and the password entered in response to the user operation to the service providing apparatus 10A via the communication unit 42. The service providing apparatus 10A performs a user authentication operation in response to the user ID and the password received from the right registration apparatus 40. If the user authentication operation is successful, the service providing apparatus 10A issues the code to retrieve the token. The service providing apparatus 10A transmits to the right registration apparatus 40 a response that is to be used to notify the right registration apparatus 40 of the URL of the relay apparatus 30 included as the movement destination in the retrieval request received from the right registration apparatus 40. The response includes the issued code. The right registration apparatus 40 receives the response via the communication unit 42. The third retrieval unit 412 retrieves the code included in the response.

In step S412, the transmission unit 413 in the right registration apparatus 40 transmits via the communication unit 42 the code included in the response received from the service providing apparatus 10A to the relay apparatus 30 as a redirection destination. The relay apparatus 30 receives the code via the communication unit 32.

In step S413, the second retrieval unit 316 in the relay apparatus 30 transmits via the communication unit 32 the retrieval request of the token to the service providing apparatus 10 selected on the service list screen 243. The retrieval request includes the code received from the right registration apparatus 40. Since the registration operation request received in step S408 includes the identification information of the service providing apparatus 10A selected on the service list screen 243 in this example, the retrieval request of the token is transmitted to the service providing apparatus 10A.

Since the retrieval request received from the relay apparatus 30 includes the code, the service providing apparatus 10A issues the token of the login user and then transmits the issued token to the relay apparatus 30 in step S414. The relay apparatus 30 receives the token via the communication unit 32. The second retrieval unit 316 retrieves the token.

In step S415, the registration processor 315 in the relay apparatus 30 stores the token received from the service providing apparatus 10A onto the user management table 331. The token of the login user is retrieved from the service providing apparatus 10A in this example. In the user management table 331 of FIG. 12, the new token received from the service providing apparatus 10A replaces the token A1 of the service providing apparatus 10A stored in association with the user ID "User01@aaa.example.com" of the login user.

In step S416, the registration processor 315 updates the user management table 331 in response to the storage of the new token. In this example, the new token of the login user to access the service providing apparatus 10A is stored in the user management table 331 in step S415. The state of the token of the service providing apparatus 10A stored in association with the user ID "User01@aaa.example.com" of the login user stored on the memory is updated from "expired" to "present" in the user management table 331 of FIG. 12.

In step S417, the registration processor 315 transmits to the right registration apparatus 40 via the communication unit 32 a notification indicating that the registration operation of the token has been completed. The right registration apparatus 40 receives the notification via the communication unit 42.

Even if a token to access the service providing apparatus 10 is not registered on the relay apparatus 30, the user may access the service providing apparatus 10 and enjoy the service by entering the credit information registered on the service providing apparatus 10 in the exemplary embodiment. In related art techniques, the user moves to the right registration apparatus 40 in the middle of the operation of the client apparatus 20, and registers the token on the relay apparatus 30 by operating the right registration apparatus 40. The exemplary embodiment thus saves the user from having to perform such a process, thereby increasing user friendliness.

The credit information entered by the user is stored a memory, such as the RAM, on the relay apparatus 30 and is deleted each time power is cut off. Accessing to the service providing apparatus 10 using the credit information is permitted to a period throughout which the credit information is stored on the memory. Temporary accessing to the service providing apparatus 10 is thus permitted. The credit information entered by the user may be the user's personal information. Since the credit information of the user is not continuously stored on the relay apparatus 30 in the exemplary embodiment, the risk of leaking of the credit information from the relay apparatus 30 is reduced.

The token stored on the relay apparatus 30 may have expired if the expiration date of the token is managed on the service providing apparatus 10 in the exemplary embodiment as described above. Even in the operation with the expired token, the user may access the service providing apparatus 10 and enjoy the service by entering the credit information registered on the service providing apparatus 10.

In the metasearch, a service providing apparatus 10 having a token registered for access and a service providing apparatus 10 having no token registered for access may co-exist among the service providing apparatuses 10 as search targets. Even in such a case, the user may still access a variety of service providing apparatuses 10 in the operation with the expired token in the metasearch.

In the token registration operation, the token to access the service providing apparatus 10 may be registered on the relay apparatus 30 even if the relay apparatus 30 has no token to access the service providing apparatus 10.

The exemplary embodiment has been described for exemplary purposes only. The exemplary embodiment may be modified as described below. The modifications described below may be used in combination.

In the exemplary embodiment, the credit information entered by the user is stored on the memory, such as the RAM of the relay apparatus 30, and is deleted when power is interrupted. Alternatively, the credit information may be deleted when a predetermined condition is satisfied.

Figure 18:
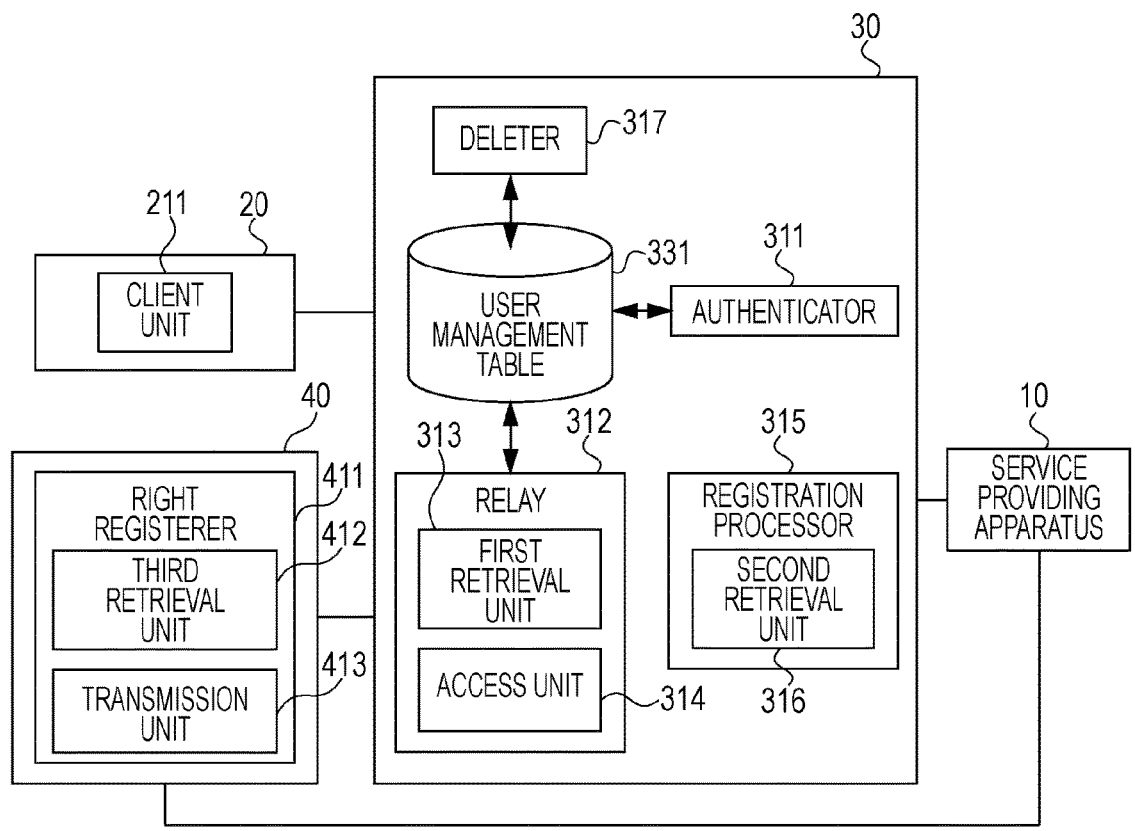
FIG. 18 illustrates a functional configuration of a relay system of a modification.

FIG. 18 illustrates a functional configuration of modification of the relay system of a modification. The relay apparatus 30 in the modification has a function of a deleter 317 in addition to the functions described in the exemplary embodiment. The deleter 317 deletes the credit information from the memory when a predetermined condition is satisfied. In this example, the memory functions as a storage unit. The predetermined condition may be that a process of the service providing apparatus 10 responsive to a request from the client apparatus 20 has been completed. For example, in the retrieval operation of data from the service providing apparatus 10A, the deleter 317 may delete the credit information stored on the memory when the data selected by the user is retrieved from the service providing apparatus 10A.

The predetermined condition may be that the user has logged out from the relay apparatus 30. In such a case, the deleter 317 may delete the credit information when a logout request has been received from the client apparatus 20.

The predetermined condition may be that a predetermined time period has elapsed since the storage of the credit information on the memory. In such a case, the deleter 317 starts measuring time from the storage of the credit information on the memory using a timer. When the measured time exceeds the predetermined time period, the deleter 317 deletes the credit information from the memory.

In the exemplary embodiment, each of the service providing apparatuses 10A through 10C permits access using the credit information. The service providing apparatuses 10 may include an apparatus that does not permit the access using the credit information. In such a case, the relay apparatus 30 stores matching information indicating whether the service providing apparatus 10 matches access using the credit information, and uses the matching information to determine whether the service providing apparatus 10 having an expired token matches the access using the credit information.

If the service providing apparatus 10 having an expired token matches the access using the credit information, the relay apparatus 30 presents the service list screen 241 to display the input boxes C1 of the credit information of FIG. 8. If the service providing apparatus 10 having an expired token does not match the access using the credit information, the relay apparatus 30 presents the service list screen 241 displaying a message, for example, "Register token". The service list screen 241 does not display the input boxes C1 for use in entering the credit information.

The program to be executed by the controller 21 in the client apparatus 20, the program to be executed by the controller 31 in the relay apparatus 30, and the program to be executed by the controller 41 in the right registration apparatus 40 in the exemplary embodiment may be downloaded via a communication line, such as the Internet. The programs may be supplied in a recorded state on one of non-transitory computer readable recording media, including a magnetic recording medium (such as a magnetic tape or a magnetic disk), an optical recording medium (such as an optical disk), a magneto-optical recording medium, and a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay apparatus comprising:
   at least one hardware processor;
   a memory configured to store, for at least one service providing apparatus, a token comprising right information indicating a right to access the service providing apparatus;
   a transmitter configured to transmit to a client apparatus, a list of the at least one service providing apparatus together with identification information identifying the token and status information indicating a current status of the token for each of the at least one service providing apparatus to be displayed by the client apparatus, prior to a request by the client apparatus to access content from the at least one service providing apparatus;
   a first retriever configured to use the hardware processor to retrieve, from the client apparatus, identification information of a user registered in a service providing apparatus selected from the list that is a target of an access request from the client apparatus; and
   an accessor configured to use the hardware processor, in response to determining that the token to access the target service providing apparatus is not valid, to update the status information of the token for the target service providing apparatus and access the target service providing apparatus using the identification information retrieved by the first retriever instead of the right information stored on the memory.

2. The relay apparatus according to claim 1, wherein in response to the access request, the accessor is configured to access the target service providing apparatus using the token stored on the memory, or access the target service providing apparatus using the identification information in response to the service providing apparatus not permitting an access using the token.

3. The relay apparatus according to claim 1, wherein the client apparatus is configured to make the access request to a plurality of service providing apparatuses,
   wherein the first retriever is further configured to use the hardware processor to retrieve identification information of a user registered in a first service providing apparatus that does not permit the access using the token stored on the memory, out of the plurality of service providing apparatuses, and
   wherein the accessor is further configured to use the hardware processor to use the identification information retrieved by the first retriever to access the first service providing apparatus, or use the token stored on the memory to access a second service providing apparatus, other than the first service providing apparatus, included in the plurality of service providing apparatuses.

4. The relay apparatus according to claim 2, wherein the client apparatus is configured to make the access request to a plurality of service providing apparatuses,
   wherein the first retriever is further configured to use the hardware processor to retrieve identification information of a user registered in a first service providing apparatus that does not permit the access using the token stored on the memory, out of the plurality of service providing apparatuses, and
   wherein the accessor is further configured to use the hardware processor to use the identification information retrieved by the first retriever to access the first service providing apparatus, or use the token stored on the memory to access a second service providing apparatus, other than the first service providing apparatus, included in the plurality of service providing apparatuses.

5. The relay apparatus according to claim 1, wherein the memory is configured to store the identification information retrieved by the first retriever,
   wherein the accessor is further configured to use the hardware processor to access the target service providing apparatus using the identification information stored on the memory in response to the token to access the target service providing apparatus not being stored on the memory, and
   wherein the relay apparatus comprises a deleter configured to use the hardware processor to delete the identification information from the memory in response to a predetermined condition being satisfied.

6. The relay apparatus according to claim 2, wherein the memory is configured to store the identification information retrieved by the first retriever,
   wherein the accessor is further configured to use the hardware processor to access the target service providing apparatus using the identification information stored on the memory in response to the token to access the target service providing apparatus not being stored on the memory, and
   wherein the relay apparatus comprises a deleter configured to use the hardware processor to delete the identification information from the memory in response to a predetermined condition being satisfied.

7. The relay apparatus according to claim 3, wherein the memory is configured to store the identification information retrieved by the first retriever,
   wherein the accessor is further configured to use the hardware processor to access the first service providing apparatus as the target service providing apparatus using the identification information stored on the memory in response to the token to access the first service providing apparatus as the target service providing apparatus not being stored on the memory, and
   wherein the relay apparatus comprises a deleter configured to use the hardware processor to delete the identification information from the memory in response to a predetermined condition being satisfied.

8. The relay apparatus according to claim 4, wherein the memory is configured to store the identification information retrieved by the first retriever,
   wherein the accessor is further configured to use the hardware processor to access the first service providing apparatus as the target service providing apparatus using the identification information stored on the memory in response to the token to access the first service providing apparatus as the target service providing apparatus not being stored on the memory, and
   wherein the relay apparatus comprises a deleter configured to use the hardware processor to delete the identification information from the memory in response to a predetermined condition being satisfied.

9. The relay apparatus according to claim 5, wherein the predetermined condition is that an operation related to the access request to the target service providing apparatus is completed.

10. The relay apparatus according to claim 6, wherein the predetermined condition is that an operation related to the access request to the target service providing apparatus is completed.

11. The relay apparatus according to claim 7, wherein the predetermined condition is that an operation related to the access request to the target service providing apparatus is completed.

12. The relay apparatus according to claim 8, wherein the predetermined condition is that an operation related to the access request to the target service providing apparatus is completed.

13. The relay apparatus according to claim 5, wherein the client apparatus is configured to make the access request in response to an operation of a user who has logged on to the relay apparatus, and
   wherein the predetermined condition is that the user has logged out from the relay apparatus.

14. The relay apparatus according to claim 6, wherein the client apparatus is configured to make the access request in response to an operation of a user who has logged on to the relay apparatus, and
   wherein the predetermined condition is that the user has logged out from the relay apparatus.

15. The relay apparatus according to claim 5, wherein the predetermined condition is that a predetermined period of time has elapsed since storage of the identification information retrieved by the first retriever onto the memory.

16. The relay apparatus according to claim 1, further comprising a second retriever configured to use the hardware processor to retrieve, from the service providing apparatus, another token to access the service providing apparatus,
wherein the memory is configured to store the other token retrieved by the second retriever.

17. The relay apparatus according to claim 1, wherein the accessor is further configured use the hardware processor to update the information on the status of the stored token for the target service providing apparatus by changing the status of the stored token for the target service providing apparatus stored in the memory to expired.

18. The relay apparatus according to claim 1, wherein the relay apparatus determines that the token to access the target service providing apparatus is not valid, in response to being denied access by the target service providing apparatus.

19. A relay system comprising a relay apparatus and a client apparatus,
wherein the relay apparatus includes:
at least one hardware processor;
a memory configured to store, for at least one service providing apparatus, a token comprising right information indicating a right to access the service providing apparatus;
a transmitter configured to transmit to the client apparatus, a list of the at least one service providing apparatus together with identification information identifying the token and status information indicating a current status of the token for each of the at least one service providing apparatus to be displayed by the client apparatus, prior to a request by the client apparatus to access content from the at least one service providing apparatus;
a first retriever configured to use the hardware processor to retrieve, from the client apparatus, identification information of a user registered in a service providing apparatus selected from the list that is a target of an access request from the client apparatus; and
an accessor configured to use the hardware processor, in response to determining that the token to access the target service providing apparatus is not valid, to update the status information of the token for the target service providing apparatus and access the target service providing apparatus using the identification information retrieved by the first retriever instead of the right information stored on the memory, and
wherein the client apparatus is configured to make an access request to the relay apparatus to access a service providing apparatus selected by a user.

20. The relay system according to claim 19, further comprising a token registration apparatus,
wherein the token registration apparatus includes:
a third retriever configured to use the hardware processor to retrieve, from the service providing apparatus, permission information to permit retrieving token indicating a right to access the service providing apparatus; and
a transmitter configured to use the hardware processor to transmit to the relay apparatus the permission information retrieved by the third retriever, and
wherein the relay apparatus includes a second retriever configured to use the hardware processor to retrieve, from the service providing apparatus, the token indicating a right to access the service providing apparatus, by transmitting to the service providing apparatus the permission information received from the right registration apparatus.

21. A relay method comprising:
storing, onto a memory, for at least one service providing apparatus, a token comprising right information indicating a right to access the service providing apparatus;
transmitting to a client apparatus, a list of the at least one service providing apparatus together with identification information identifying the token and status information indicating a current status of the token for each of the at least one service providing apparatus to be displayed by the client apparatus, prior to a request by the client apparatus to access content from the at least one service providing apparatus;
retrieving, from the client apparatus, identification information of a user registered in a service providing apparatus selected from the list that is a target of an access request from the client apparatus;
in response to determining that the token to access the target service providing apparatus is not valid, updating the status information of the token for the target service providing apparatus and accessing the target service providing apparatus using the retrieved identification information instead of the right information stored on the memory.

22. A non-transitory computer readable medium storing a program causing a computer to execute a process for relaying, the computer including a memory configured to store, for at least one service providing apparatus, a token comprising right information indicating a right to access the service providing apparatus, the process comprising:
transmitting to a client apparatus, a list of the at least one service providing apparatus together with identification information identifying the token and status information indicating a status of the token for each of the at least one service providing apparatus to be displayed by the client apparatus, prior to a request by the client apparatus to access content from the at least one service providing apparatus;
retrieving, from the client apparatus, identification information of a user registered in a service providing apparatus selected from the list that is a target of an access request from the client apparatus;
in response to determining that the token to access the target service providing apparatus is not valid, updating the status information of the token for the target service providing apparatus and accessing the target service providing apparatus using the retrieved identification information instead of the right information stored on the memory.

* * * * *